(12) United States Patent
Lee

(10) Patent No.: US 7,849,339 B2
(45) Date of Patent: Dec. 7, 2010

(54) POWER-SAVING CLOCKING TECHNIQUE

(75) Inventor: Dongyun Lee, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 898 days.

(21) Appl. No.: 11/690,659

(22) Filed: Mar. 23, 2007

(65) Prior Publication Data
US 2008/0235526 A1   Sep. 25, 2008

(51) Int. Cl.
*G06F 1/32* (2006.01)
(52) U.S. Cl. .................. 713/322; 713/323; 713/324; 713/600; 327/117; 327/156
(58) Field of Classification Search ......... 713/322–324, 713/600; 327/117, 156
See application file for complete search history.

(56) References Cited

U.S. PATENT DOCUMENTS

| | | | |
|---|---|---|---|
| 5,982,210 A | 11/1999 | Rogers | |
| 6,718,473 B1 * | 4/2004 | Mirov et al. | 713/320 |
| 6,996,749 B1 * | 2/2006 | Bains et al. | 714/42 |
| 7,036,032 B2 | 4/2006 | Mizuyabu et al. | |
| 7,089,444 B1 * | 8/2006 | Asaduzzaman et al. | 713/600 |
| 7,155,617 B2 * | 12/2006 | Gary et al. | 713/300 |
| 7,496,774 B2 * | 2/2009 | Lu | 713/322 |
| 2005/0174153 A1 | 8/2005 | Saeki | |
| 2005/0242851 A1 | 11/2005 | Booth et al. | |
| 2007/0035336 A1 | 2/2007 | Lee | |

OTHER PUBLICATIONS

International Preliminary Report on Patentability for International Patent Application No. PCT/US2008/057926 mailed Oct. 8, 2009.
International Search Report & Written Opinion for International Application No. PCT/US2008/57926 mailed Aug. 7, 2008.

* cited by examiner

*Primary Examiner*—Thuan N Du
(74) *Attorney, Agent, or Firm*—Blakely Sokoloff Taylor & Zafman

(57) ABSTRACT

A method and system for providing a clock signal having reduced power consumption is provided, called the hybrid clock system. The hybrid clock system uses a PLL for high-speed data transfers, but provides a power-saving mode for transferring data while consuming less power. In the normal mode, the hybrid clock system contains a reference clock that operates at a low frequency that drives a PLL. The PLL multiplies the reference clock frequency to a much higher frequency, and supplies the clock signal to a data transfer circuit. In the power-saving mode, the hybrid clock system turns off the PLL and connects the reference clock directly to the data transfer circuit.

48 Claims, 2 Drawing Sheets

POWER-SAVING CLOCKING TECHNIQUE

BACKGROUND

In electronics, a phase-locked loop (PLL) is a closed-loop feedback control system that generates and outputs a signal in relation to the frequency and phase of an input ("reference") signal. A PLL circuit responds to both the frequency and the phase of the input signal, automatically adjusting the frequency and phase of a controlled oscillator until the frequency and phase match that of the reference signal. This type of mechanism is widely used in radio, telecommunications, computers, and other electronic applications where it is desirable to stabilize a generated signal or to detect signals in the presence of noise. Since an integrated circuit can hold a complete phase-locked loop building block, the technique is widely used in modern electronic devices, with signal frequencies from a fraction of a cycle per second up to several gigahertz (GHz).

Circuit designers often use digital PLL circuits as master clock synthesizers for microprocessors and key components of universal asynchronous receiver transmitters (UARTs). PLLs generally contain a phase detector, low pass filter, and voltage-controlled oscillator (VCO) placed in a negative feedback configuration. There may be a frequency divider in the feedback path or in the reference path, or both, in order to make the output clock of the PLL a rational multiple of the reference frequency. The oscillator generates a periodic output signal. Depending on the application, either the output of the controlled oscillator or the control signal to the oscillator provides the useful output of the PLL system.

PLLs are widely used for synchronization purposes. Circuits commonly send some data streams, especially high-speed serial data streams (such as the raw stream of data from the magnetic head of a disk drive), without an accompanying clock. The receiver generates a clock from an approximate frequency reference, and then phase-aligns to the transitions in the data stream using a PLL. This process is referred to as clock data recovery (CDR). Another use for PLLs is clock multiplication. Most electronic systems include processors of various sorts that operate at hundreds of megahertz. Typically, the clocks supplied to these processors come from clock generator PLLs, which multiply a lower-frequency reference clock (usually 50 or 100 MHz) up to the operating frequency of the processor. The multiplication factor can be quite large in cases where the operating frequency of the processor is multiple gigahertz and the reference clock is just tens or hundreds of megahertz.

While PLLs are very broadly used, unfortunately they are not suitable for some applications because the large number of components in a PLL cause the PLL to consume a significant amount of power. For example, mobile device manufacturers might prefer the functionality of a PLL to perform CDR and clock multiplication for high-speed data transfers. The battery drain inherent in a PLL, however, and the impact on battery life of a mobile device often mean that manufacturers must elect to use other technologies or end up compromising the device performance.

DETAILED DESCRIPTION

Figure 1:
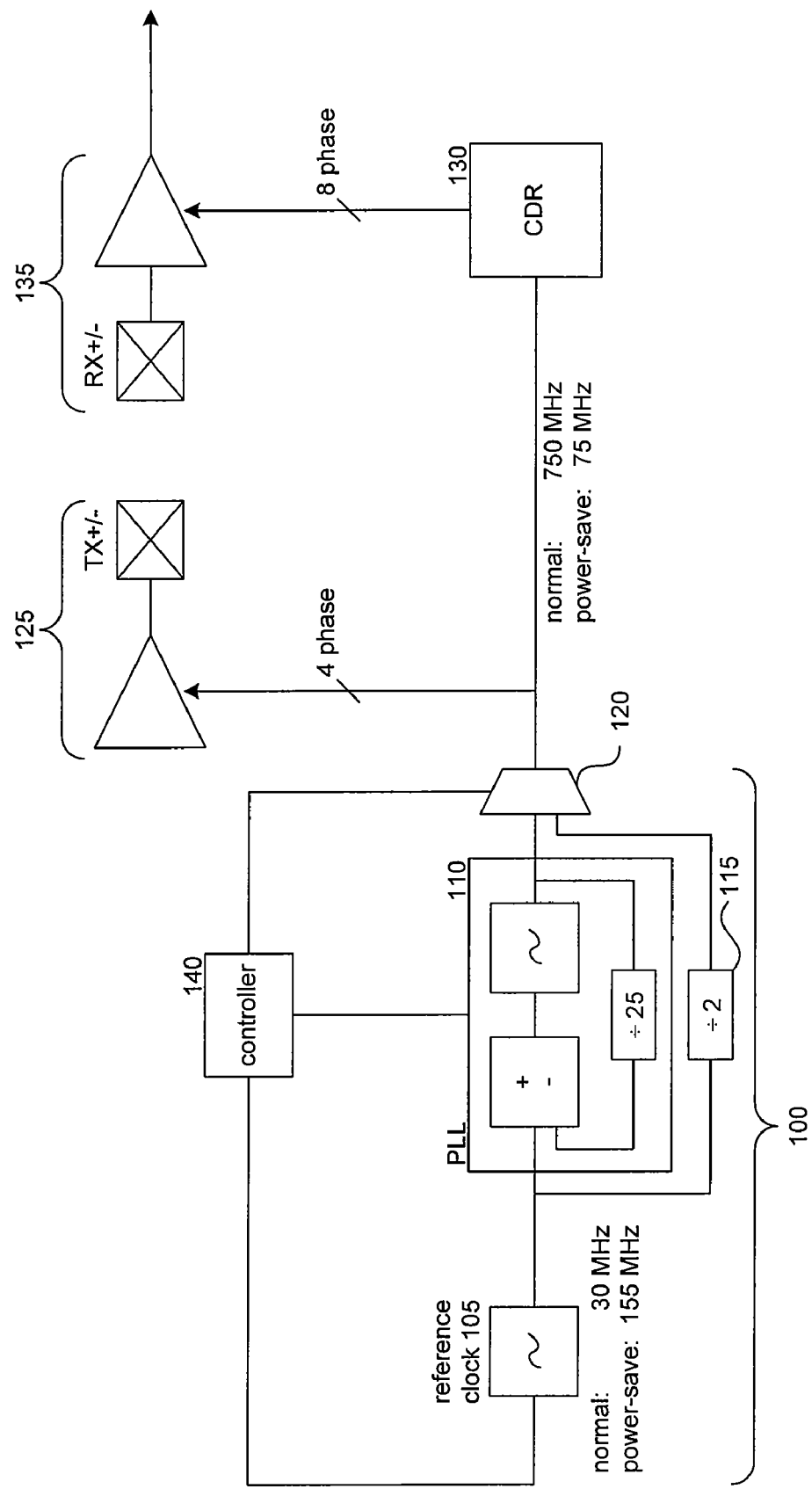
FIG. 1 is a circuit diagram illustrating a hybrid clock system used in conjunction with a serializer/deserializer.

A method and system for providing a clock signal having reduced power consumption is provided (the "hybrid clock system"). The hybrid clock system operates in a normal mode of operation and a power-saving mode of operation. In the normal mode of operation, the hybrid clock system uses a PLL for high-speed data transfers. A reference clock that operates at a low frequency (e.g., 30 MHz) is connected to the input of the PLL. The PLL multiplies the reference clock frequency to a much higher frequency (e.g., 3 GHz), and supplies the clock signal to a data transfer circuit. When the hybrid clock system detects low-speed activity in the data transfer circuit, the hybrid clock system switches (or transitions) to the power-saving mode. In the power-saving mode of operation, the hybrid clock system turns off the PLL and connects the reference clock directly to the data transfer circuit. Because of the slower clock speed, in the power-saving mode the data transfer circuit transfers data at a lower rate than when the hybrid clock system is in the normal mode. For many applications, such as mobile phones, the lower transfer speed of the power-saving mode provides adequate data transfer capabilities for some data transfer requests, thereby minimizing the amount of time that the device operates in the normal mode. In this way, the hybrid clock system reduces the power consumed by a device, while still offering high-speed data transfer capabilities.

In some embodiments, the hybrid clock system uses the power-saving mode temporarily while restarting the PLL. For example, when the hybrid clock system is in the power-saving mode and a high-speed data transfer is requested, the hybrid clock system may initiate the transfer in the power-saving mode, and signal the PLL to restart. Once the PLL is restarted, the hybrid clock system switches to the normal mode having full high-speed data transfer capabilities. In some embodiments, the user may see the transfer begin and progressively get faster, providing a better user experience than if the user had to wait for the PLL to restart to begin data transfer.

In some embodiments, the hybrid clock system accelerates the reference clock in the power-saving mode. For example, the reference clock frequency may be increased (e.g., to 150 MHz) to provide the fastest signal available from the reference clock. The circuit used for the reference clock is often capable of faster speeds, but a lower speed is selected to match a multiplication factor of the chosen PLL circuit. When the PLL is turned off, the hybrid clock system may run the reference clock at its maximum speed to provide as much speed as possible without the PLL. Users therefore do not see an appreciable reduction in speed by increasing the clock frequency limits while in the power-saving mode.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a circuit diagram illustrating the use of a hybrid clock system 100 to provide a clock signal to a serializer/deserializer. The hybrid clock system contains an adjustable reference clock 105, the output of which is connected to the input of a phased-locked loop (PLL) 110, and a clock divider 115. The clock divider is coupled to a multiplexer 120 at the output of the PLL. The PLL 110 also contains a clock divider for setting the multiplication factor of the PLL. One setting of the multiplexer 120 removes the clock divider 115 from the circuit, allowing the reference clock to drive the PLL and generate the clock signal. Another setting of the multiplexer 120 inserts the clock divider 115 into a circuit path that bypasses the PLL. When the PLL is bypassed, the output of the reference clock is divided by the clock divider 115 before being applied to the remaining circuit. A controller 140 is connected to the reference clock 105, PLL 110, and multiplexer 120 in order to change the settings of these components when the hybrid clock system is switched between the normal and power-saving modes of operation. The output of the hybrid clock system may provide a clock signal to a serializer circuit 125 for transmitting data. The output of the hybrid clock system may also provide a clock signal to a clock data recovery (CDR) circuit 130 and a deserializer circuit 135 for receiving data.

During operation, the reference clock 105 provides the base clock signal. In normal mode, the reference clock provides a clock signal to the PLL 105. The PLL 105 multiplies the reference clock 105 signal and provides a high-speed clock signal to the serializer circuit 125 and deserializer circuit 135 (the latter through the CDR circuit 130). In power-saving mode, the reference clock 105 is adjusted to a produce a higher frequency clock signal and the PLL 110 is turned off. Instead of driving the PLL, the reference clock signal is divided by the clock divider 115 to provide an appropriate clock frequency to the serializer circuit 125 and deserializer circuit 135. In the power-saving mode, the deserializer circuit 135 and serializer circuit 125 operate at a lower frequency than during the normal mode of operation.

In some embodiments, the reference clock is a time base that may be adjusted to produce a clock signal that varies between 30 MHz and 150 MHz, the PLL is able to multiply the clock signal by a factor of 25, and the clock divider can divide the clock signal by a factor of two. In this configuration, the hybrid clock system is able to output a clock signal of 750 MHz during a normal mode of operation with a 30 MHz reference clock and a clock signal of 75 MHz during a power-saving mode of operation with a 150 MHz reference clock. Those skilled in the art will appreciate that other component values may be utilized in the hybrid clock system to produce a clock signal having different frequencies.

Figure 2:
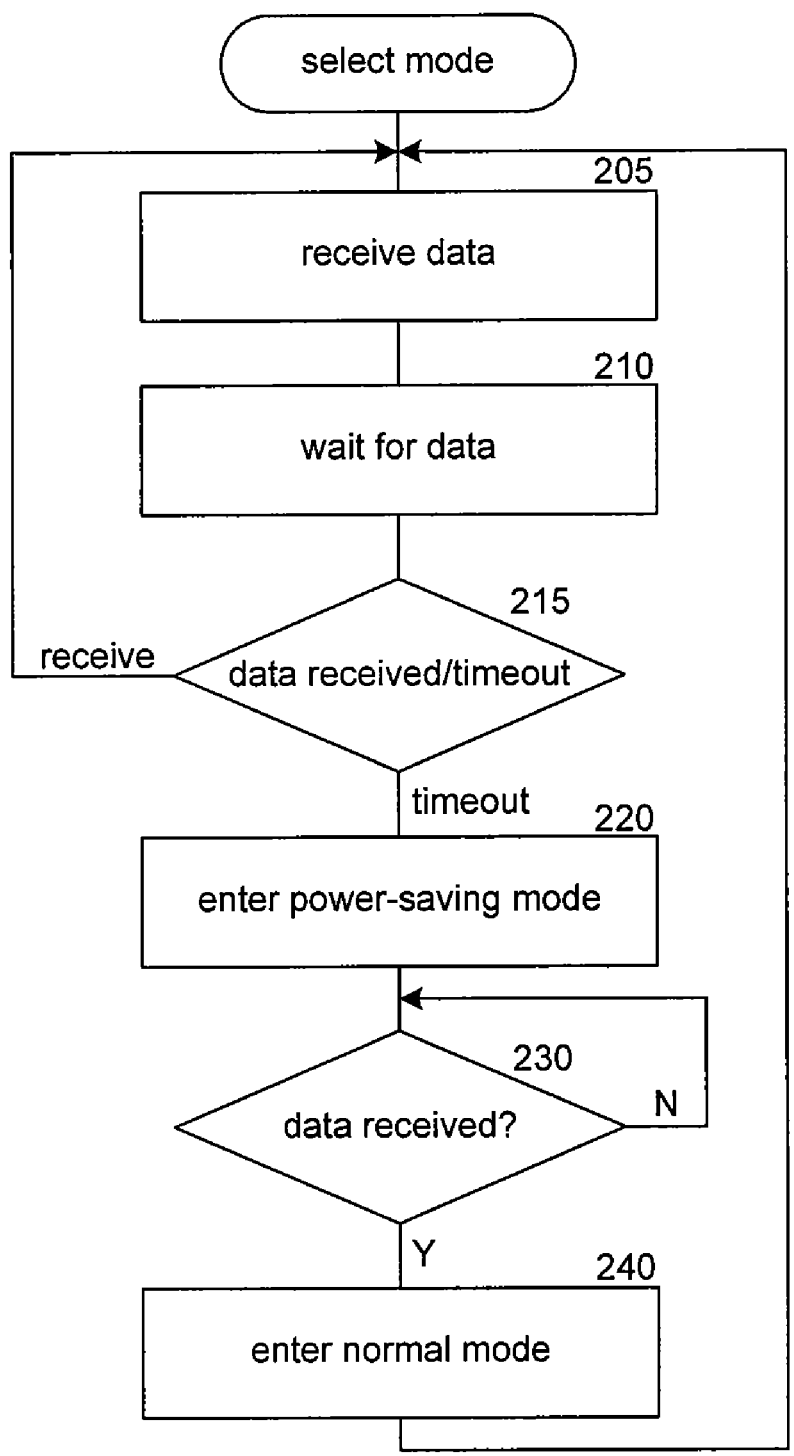
FIG. 2 is a flow diagram illustrating the processing of the hybrid clock system when switching modes of operation.

FIG. 2 is a flow diagram illustrating the processing of the hybrid clock system when switching between the normal mode and the power-saving mode. In block 205, the system detects when data is being received by the serializer over the serial link. In block 210, the system waits for additional data to be received by the serializer. In decision block 215, if additional data is received within a timeout period, then processing loops to block 205 where the system monitors the serializer. If additional data is not received within a timeout period, then processing continues at block 220. In block 220, the hybrid clock system enters the power-saving mode. The PLL is disabled, the frequency of the reference clock is increased, and the multiplexer is switched to enable the circuit path with the clock divider. Those skilled in the art will recognize that mechanisms other than the expiration of a timeout period may trigger the system to enter the power-saving mode. For example, the system may automatically enter the power-saving mode after each transmission. Alternatively, the system may monitor a queue of data scheduled to be transmitted and may enter the power-saving mode if it is determined that the schedule can be satisfied at the lower data transmission rate of the power-saving mode. In decision block 230, if the system does not detect that the deserializer has received additional data, then processing loops to decision block 230 and continues to wait for data. If the system detects the receipt of data, processing continues to block 240 where the system enters the normal mode and then returns to block 205 to monitor the receipt of additional data. In the normal mode, the PLL is enabled, the frequency of the reference clock is decreased, and the multiplexer is switched to disable the circuit path with the clock divider. Those skilled in the art will recognize that other conditions may affect entering the normal mode. For example, even though additional data is received, the system may wait to enter the normal mode until additional data is arriving at a rate in excess of the capacity of the power-saving mode.

The device in which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement parts of the system, which means a computer-readable medium that contains the instructions. In addition, the data structures and message structures may be stored or transmitted via a data transmission medium, such as a signal on a communication link. Various communication links may be used, such as a serial transfer link, the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

From the foregoing, it will be appreciated that specific embodiments of the hybrid clock system have been described herein for purposes of illustration, but that various modifications may be made without deviating from the spirit and scope of the invention. Accordingly, the invention is not limited except as by the appended claims.

I claim:

1. A method of providing clocking for data transfer comprising:
   generating a reference clock signal with a reference clock component;
   switching to a first setting in response to a signal at a first value for a first data transfer requiring high-speed clocking;
   generating a first clock signal for a data transfer circuit in the first setting, generation of the first clock signal including:
      enabling a phase-locked loop component,
      disabling a clock divider component coupled with the reference clock component in the first setting;
      applying the reference clock signal to the phase-locked loop component, and generating a high-speed clock signal using the phase-locked loop component based on the reference clock signal, and utilizing the high-speed clock signal to provide clocking for the data transfer circuit;

switching to a second setting in response to the signal at a second value for operation that does not require high-speed clocking; and generating a second clock signal for the data transfer circuit in the second setting, generation of the second clock signal including:

enabling the clock divider component in the second setting to divide the frequency of the reference clock signal using the clock divider component;

disabling the phase-locked loop component, and utilizing the reference clock signal to provide clocking for the data transfer circuit.

2. The method of claim 1, wherein the first setting is a normal high-speed setting and the second setting is a power-saving setting as compared to the first setting.

3. The method of claim 1, wherein generating the high-speed clock signal with the phase-locked loop component includes multiplying a frequency of the reference clock signal to generate a frequency of the high-speed clock signal.

4. The method of claim 1, further comprising disabling the utilization of the reference clock signal from providing the clocking for the data transfer circuit in the first setting upon utilization of the high-speed clock signal.

5. The method of claim 4, further comprising:

initiating the first data transfer utilizing the reference clock signal; and utilizing the high-speed clock signal to provide clocking for the data transfer circuit to continue the first data transfer.

6. The method of claim 1, wherein the reference clock component operates at a first frequency in the first setting and operates at a second frequency in the second setting.

7. The method of claim 6, wherein the second frequency is higher than the first frequency.

8. The method of claim 1, further comprising restarting the phase-locked loop component in the second setting to initiate a second data transfer requiring high-speed clocking.

9. The method of claim 1, further comprising powering off the phase-locked loop in the second setting.

10. The method of claim 1, wherein clocking for data transfer further comprises usage of a clock data recovery circuit.

11. The method of claim 10, wherein the use of the clock data recovery circuit is controlled by a signal.

12. A hybrid clock system comprising:

a reference clock component configured to provide a reference clock signal;

a phase-locked loop component configured to multiply the reference clock signal;

a connection to a data transfer circuit to transmit or receive data at a rate determined by a provided clock signal;

a multiplexer having a first setting and a second setting for the hybrid clock system, wherein:

in the first setting, the phase-locked loop component is enabled, the reference clock being coupled with the phase-locked loop component, the phase-locked loop component generating a high-speed clock signal for the data transfer circuit, and in the second setting, the phase-locked loop component is disabled, the reference clock signal being utilized to provide clocking to the data transmission component; and a clock divider component, the clock divider component being enabled in the second setting and disabled in the first setting, the clock divider component to divide a clock rate of the reference clock component.

13. The system of claim 12, wherein upon receiving a request for a data transfer requiring high-speed transfer when the multiplexer is in the second setting, the system is to initiate the data transfer in the second setting and continue the data transfer in the first setting.

14. The system of claim 12, wherein the clock rate of the reference clock component is higher in the second setting than in the first setting.

15. The system of claim 12, wherein the data transfer circuit further comprises a serializer circuit.

16. The system of claim 12, wherein the data transfer circuit further comprises a deserializer circuit.

17. The system of claim 16, wherein the deserializer circuit further comprises a clock data recovery circuit.

18. A method of controlling clocking for data transmission, comprising:

setting a data transfer circuit to a power-saving mode, wherein data is transmitted at a first rate in the power-saving mode, setting the data transmission circuit to the power-saving mode including disabling a phased-locked loop component and utilizing a reference clock signal to establish the first rate, wherein the power-saving mode includes activating a clock divider component, the clock divider component dividing a clock rate of the reference clock signal;

initiating a data transfer requiring high-speed transmission while in the power-saving mode;

receiving a first portion of the data transfer from the data transmission circuit at the first rate;

setting the data transfer circuit to a normal high-speed transmission mode, wherein data is transmitted at a second rate in the high-speed transmission mode, setting the data transfer circuit to the high-speed transmission mode including enabling the phased-locked loop component to multiply the reference clock signal from the reference clock component;

continuing the data transfer in the high-speed transmission mode; and receiving a second part of the data transfer from the data transmission circuit at the second rate.

19. The method of claim 18, wherein the second rate is faster than the first rate.

20. The method of claim 18, wherein the clock rate of the reference clock signal is increased for the power-saving mode.

21. The method of claim 18, further comprising powering off the phase-locked loop component in the power-saving mode.

22. The method of claim 18, further comprising restarting the phase-locked loop component in the power-saving mode to initiate the data transfer.

23. The method of claim 22, further comprising restarting the phase-locked loop component restart using a signal.

24. The method of claim 22, further comprising restarting the phase-locked loop component using configuration data.

25. The method of claim 22, further comprising detecting phase-locked loop restart status using a signal.

26. The method of claim 25, wherein the detection of the phase-locked loop restart status further comprises reading configuration data.

27. The method of claim 25, wherein the detection of the phase-locked loop restart status further comprises determining that data is received at the correct speed for high-speed transmission.

28. The method of claim 18, wherein switching to the power-saving mode includes switching to the power-saving mode upon a timeout period expiring after receiving data for processing.

29. The method of claim 18, wherein switching to the power-saving mode includes detecting low speed activity.

30. The method of claim 18, wherein switching to the power-saving mode occurs after every transfer performed in the high-speed transmission mode.

31. The method of claim 18, wherein switching to the high-speed transmission mode includes detecting high-speed activity.

32. The method of claim 18, wherein switching between the high-speed transmission mode and the power-saving mode is controlled by a signal.

33. The method of claim 18, wherein switching between the high-speed transmission mode and the power-saving mode includes setting configuration data.

34. The method of claim 18, wherein switching between the high-speed transmission mode and the power-saving mode includes determining the data rate required to satisfy a data transmission request.

35. The method of claim 18, wherein the data transfer circuit includes a clock data recovery circuit.

36. The method of claim 18, wherein the use of the clock data recovery circuit is controlled by a signal.

37. The method of claim 35, wherein the use of the clock data recovery control circuit is controlled using configuration data.

38. A computer-readable medium having stored thereon data representing instructions that, when executed by a processor, cause the processor to perform operations comprising:
 generating a reference clock signal with a reference clock component;
 switching to a first setting in response to a signal at a first value;
 generating a first clock signal for a data transfer circuit in the first setting, generation of the first clock signal including:
  disabling a phase-locked loop component, and
  enabling a clock divider component coupled with the reference clock component;
  dividing a frequency of the reference clock signal using the clock divider component;
  utilizing the reference clock signal to provide clocking for a data transfer circuit;
 switching to a first setting in response to a signal at a first value;
 initiating a first data transfer with the clocking provided by the first clock signal;
 generating a second clock signal for a data transfer circuit in the setting, generation of the clock signal including:
  disabling the clock divider component;
  enabling the phase-locked loop component, and
  applying the reference clock signal to the phase-locked loop component, and generating a high-speed clock signal with the phase-locked loop component based on the reference clock signal, and
  utilizing the high-speed clock signal to provide clocking for the data transfer circuit; and
 continuing the first data transfer with the clocking provided by the second clock signal.

39. The medium of claim 38, wherein the second setting is a normal high-speed setting and the first setting is a power-saving setting as compared to the second setting.

40. The medium of claim 38, wherein generating the high-speed clock signal with the phase-locked loop component includes multiplying a frequency of the reference clock signal to generate a frequency of the high-speed clock signal.

41. The medium of claim 38, wherein the reference clock component operates at a first frequency in the first setting and operates at a second frequency in the second setting.

42. The medium of claim 41, wherein the second frequency is higher than the first frequency.

43. The medium of claim 38, wherein switching to the first setting includes switching upon a timeout period expiring after receiving data for processing.

44. The medium of claim 38, wherein switching to the first setting includes detecting low speed activity.

45. The medium of claim 38, wherein switching to the first setting occurs after every transfer performed in the second setting.

46. The medium of claim 38, wherein switching to the second setting includes detecting high-speed activity.

47. The medium of claim 38, wherein switching between the first setting and the second setting includes setting configuration data.

48. The medium of claim 38, wherein switching between the first setting and the second setting includes determining the data rate required to satisfy a data transmission request.

* * * * *